United States Patent
Rosenthal et al.

(10) Patent No.: US 10,607,204 B2
(45) Date of Patent: *Mar. 31, 2020

(54) SUPPORT MESSAGES BASED ON MERCHANT ACCOUNT CONTEXT

(71) Applicant: Square, Inc., San Francisco, CA (US)

(72) Inventors: Nathan Rosenthal, San Francisco, CA (US); Tyler Kovacs, Oakland, CA (US); Michael Smith, Santa Cruz, CA (US)

(73) Assignee: Square, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/120,177

(22) Filed: Aug. 31, 2018

(65) Prior Publication Data

US 2019/0095895 A1  Mar. 28, 2019

Related U.S. Application Data

(63) Continuation of application No. 14/541,115, filed on Nov. 13, 2014, now Pat. No. 10,068,215.

(51) Int. Cl.
  *G06Q 10/06* (2012.01)
  *G06Q 20/20* (2012.01)
  *G06Q 20/32* (2012.01)

(52) U.S. Cl.
  CPC ......... *G06Q 20/204* (2013.01); *G06Q 20/325* (2013.01)

(58) Field of Classification Search
  CPC ......... G06Q 10/06; G06Q 20/06; G06Q 10/20
  See application file for complete search history.

(56) References Cited

U.S. PATENT DOCUMENTS

| | | |
|---|---|---|
| 7,889,666 B1 | 2/2011 | Pei et al. |
| 10,068,215 B1 | 9/2018 | Rosenthal et al. |
| 10,460,324 B1 | 10/2019 | Westen |
| 2002/0174380 A1* | 11/2002 | Mannarsamy ...... G06F 11/0748 714/25 |
| 2006/0259272 A1* | 11/2006 | Sattler ................ G06F 16/9535 702/181 |
| 2007/0143239 A1* | 6/2007 | Boyle ...................... G06N 5/04 706/45 |

(Continued)

OTHER PUBLICATIONS

Non-Final Office Action dated Sep. 11, 2015, for U.S. Appl. No. 14/541,115, of Rosenthal, N., et al., filed Nov. 13, 2014.

(Continued)

*Primary Examiner* — Talia F Crawley
(74) *Attorney, Agent, or Firm* — Lee & Hayes, P.C.

(57) ABSTRACT

A payment processing system for mobile point-of-sale transactions from a mobile point of sale terminal including a payment card reader having a card interface configured to read data from a payment card, the payment processing system includes an automated support system for proactively generating and presenting support messages for merchants using a mobile point-of-sale terminal. The automated support system generates the support message using a current account context for the merchant account and a plurality of rules that indicate a problem with the merchant account. The automated support system is further configured to generate a plurality of rules for detecting merchant account problems using a knowledge database of support tickets that include a human generated response to a merchant account problem and a corresponding merchant account context at the time of the human generated response.

20 Claims, 7 Drawing Sheets

(56) References Cited

U.S. PATENT DOCUMENTS

| | | | |
|---|---|---|---|
| 2008/0294931 A1* | 11/2008 | Bantz | G06F 11/2257 714/1 |
| 2009/0157674 A1* | 6/2009 | Curry | G06F 16/217 |
| 2010/0082388 A1* | 4/2010 | Dixit | G06Q 10/06 714/27 |
| 2010/0100412 A1* | 4/2010 | Cases | G06Q 10/06 705/7.27 |
| 2012/0078751 A1* | 3/2012 | MacPhail | G06Q 20/06 705/26.41 |
| 2012/0216081 A1* | 8/2012 | Duvvoori | G06Q 10/06 714/48 |
| 2013/0036000 A1* | 2/2013 | Giordano | G06Q 40/02 705/14.27 |
| 2013/0046764 A1* | 2/2013 | Choi | G06Q 10/06 707/740 |
| 2013/0282725 A1* | 10/2013 | Rubinger | G06Q 10/20 707/740 |
| 2014/0280068 A1 | 9/2014 | Dhoopar et al. | |
| 2015/0030151 A1* | 1/2015 | Bellini | G06Q 10/063 379/265.06 |

OTHER PUBLICATIONS

Non-Final Office Action dated Mar. 24, 2016, for U.S. Appl. No. 14/541,115, of Rosenthal, N., et al., filed Nov. 13, 2014.

Final Office Action dated Nov. 18, 2016, for U.S. Appl. No. 14/541,115, of Rosenthal, N., et al., filed Nov. 13, 2014.

Non-Final Office Action dated May 15, 2017, for U.S. Appl. No. 14/541,115, of Rosenthal, N., et al., filed Nov. 13, 2014.

Final Office Action dated Dec. 21, 2017, for U.S. Appl. No. 14/541,115, of Rosenthal, N., et al., filed Nov. 13, 2014.

Notice of Allowance dated May 2, 2018, for U.S. Appl. No. 14/541,115, of Rosenthal, N., et al., filed Nov. 13, 2014.

Non-Final Office Action dated Dec. 14, 2018, for U.S. Appl. No. 15/199,252, of Westen, P., filed Jun. 30, 2016.

Final Office Action dated Mar. 4, 2019, for U.S. Appl. No. 15/199,252, of Westen, P., filed Jun. 30, 2016.

Advisory Action dated May 13, 2019, for U.S. Appl. No. 15/199,252, of Westen, P., filed Jun. 30, 2016.

Notice of Allowance dated Jun. 12, 2019, for U.S. Appl. No. 15/199,252, of Westen, P., filed Jun. 30, 2016.

* cited by examiner

```
┌─────────────────────────────────────────────────────────────┐
│ Build support rules for detecting a particular merchant      │
│ account problem based on human generated support tickets in  │
│ a knowledge database                                         │
│ 202                                                          │
└─────────────────────────────────────────────────────────────┘
                              │
                              ▼
┌─────────────────────────────────────────────────────────────┐
│ Generate a current merchant account context using merchant   │
│ account attributes collected for a particular merchant       │
│ account                                                      │
│ 204                                                          │
└─────────────────────────────────────────────────────────────┘
                              │
                              ▼
┌─────────────────────────────────────────────────────────────┐
│ Determine a problem with the particular merchant account by  │
│ comparing the current merchant account context with the      │
│ support rules                                                │
│ 206                                                          │
└─────────────────────────────────────────────────────────────┘
                              │
                              ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
  Generate a possible solution to the current merchant account
│ problem based on solutions in the support tickets           │
  208
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                              │
                              ▼
┌─────────────────────────────────────────────────────────────┐
│ Present a message to a merchant indicating a possible        │
│ solution to the particular merchant account problem          │
│ 210                                                          │
└─────────────────────────────────────────────────────────────┘
```

Group the support tickets based on tags that indicate a specific merchant account problem
402

Analyze a group of support tickets to determine possible solutions to the specific merchant account problem from the human generated responses in the support tickets
404

If there is more than one solution for a merchant account problem, determine a set of possible solutions for the problem
406

SUPPORT MESSAGES BASED ON MERCHANT ACCOUNT CONTEXT

RELATED APPLICATIONS

This application claims priority to U.S. patent application Ser. No. 14/541,115, filed Nov. 13, 2014, which is incorporated herein by reference.

BACKGROUND

Mobile payment systems allow individuals and merchants to accept debit and credit cards on their smartphone, tablet, or other mobile computing device. Some mobile payment systems include a payment card reader that reads and transmits payment card information to a connected mobile computing device. The mobile computing device then transmits the payment card information and other transaction information to a payment processing system to be processed. However, with such systems, problems may arise that result in poor system performance.

Typically, such systems include a self-help customer support component, such as a support website, to help users alleviate the problems and restore performance. However, existing support solutions require users to look through lists of help topics or search to find a solution to the problem. This is problematic since the users generally don't know what the problem is, much less the circumstances that are causing the problem, and therefore do not know where to look or what to search for to find a solution. Failure to find a solution with the self-help support component often leads to the user contacting a live support representative and consuming time and resources that may be beneficially spent on other matters.

BRIEF DESCRIPTION OF THE DRAWINGS

The techniques described herein are illustrated by way of example, and not by way of limitation, in the figures of the accompanying drawings, in which like reference numerals are used to refer to similar elements.

The figures depict various embodiments of the techniques described herein for purposes of illustration only. It should be readily recognized from the following discussion that alternative embodiments of the structures and methods illustrated herein may be employed without departing from the principles of the techniques described herein.

DETAILED DESCRIPTION

Example embodiments described herein include techniques and hardware arrangements for proactively generating and presenting support messages for merchants using a mobile point-of-sale terminal. More specifically, the techniques introduced herein include generating a merchant account context for a merchant account associated with a merchant using a mobile point-of-sale terminal. Additionally, the techniques include analyzing the merchant account context using a plurality of support rules to determine a problem experienced by the merchant and operating the merchant account and/or the mobile point-of-sale terminal. The techniques further include generating and transmitting a message for display to the merchant, the message describing the problem and including instructions for fixing the problem.

Moreover, the techniques and hardware described herein include arrangements for generating the plurality of support rules and solutions to merchant account problems using a knowledge database of support tickets that include a human generated response to a merchant account problem and a corresponding merchant account context at the time of the human generated response. For example, for a particular merchant account problem, each of the plurality of support tickets related to the particular merchant account problem may be analyzed and a unique set of merchant account attributes that correspond to the particular merchant account problem may be determined from the merchant account contexts associated with the support tickets. Furthermore, a solution to the merchant account problem may be determined by analyzing each of the plurality of support tickets related to the particular merchant account problem.

Figure 1:
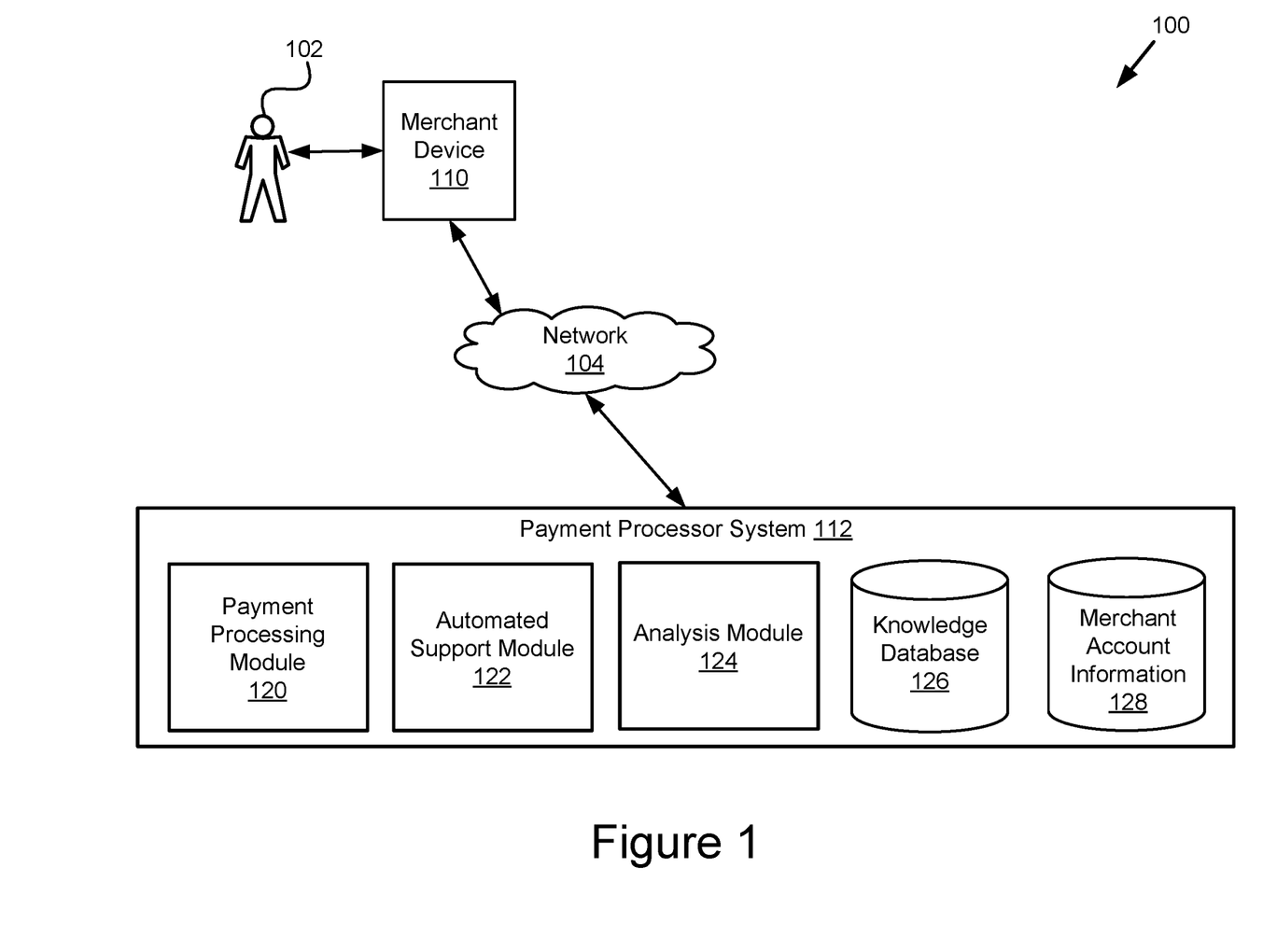
FIG. 1 illustrates an example architecture of a payment communication system for enabling transactions between merchants and buyers.

FIG. 1 illustrates an example architecture of a payment processing system 100 for enabling transactions between merchants 102 and buyers. In the example of FIG. 1, a buyer may use any of a variety of payment cards when participating in a point-of-sale (POS) transaction with the merchant 102. In some embodiments, the payment cards may include one or more magnetic stripes for providing payment card and buyer information when swiped in a card reader. In other embodiments, other types of payment cards or methods may be used, for example smart cards having a built in integrated circuit including a memory chip or a radio frequency identification tag, a mobile communication device including a near field communication chip, and the like.

The payment processing system 100 in the example of FIG. 1 illustrates a merchant device 110 associated with the merchant 102 that participates in the payment processing service provided by a service provider. The merchant device 110, as discussed elsewhere herein, may be any appropriate computing device configured to allow the merchant 102 to access the payment processor system 112 over the network 104. In some embodiments the merchant device 110 may be a mobile computing device such as a smartphone or a tablet. In other embodiments, the merchant device 110 may be a desktop computer, a laptop computer, a netbook, or other computing device.

In some embodiments, the merchant device 110 may include an instance of a merchant application executed on the merchant device 110. The merchant application may provide POS functionality to enable the merchant 102 to accept payments at a POS location using the merchant device 110. The merchant application running on the merchant device 110 may send transaction information via network 104 (e.g., the internet) to the payment processor system 112, e.g., as the transaction is being conducted at the POS location. The transaction information may include information regarding the time, place, and the amount of each respective transaction, information related to the item acquired, payment card information, as well as additional information, such as buyer information.

In other embodiments, the merchant device 110 may include an internet browser, or the like. The merchant application and/or the internet browser provide the merchant 102 access to a merchant dashboard and/or merchant support site provided by the operator of the payment provider system 112. The merchant dashboard displays merchant account activity and gives merchants tools to manage merchant accounts. For example, the merchant dashboard allows a merchant to review sales and other reports, create items and pricing, set up employee accounts, review customer feedback, adjust account settings, etc. The merchant support site provides detailed support articles for various questions and issues that a merchant may encounter while operating a merchant device or using a merchant account. In some embodiments, the merchant may provide login information to the support site to receive personalized support relating to the merchant's account.

The payment processor system 112 enables a service provider to provide a payment service in which merchants 102 are able to conduct POS transactions with buyers, such as for selling services and/or products to the buyers. The payment processor system 112 includes a payment processing module 120, automated support module 122, analysis module 124, knowledge database 126, and merchant account information 128. The payment processing module 120 receives transaction information for processing payments made through a merchant application of a merchant device 110. For example, the payment processing module 120 may receive transaction information, including payment card information, from the merchant device 110 and verify that the payment card can be used to pay for the transaction, such as by contacting a card clearinghouse of a payment card network.

The automated support module 122 includes software and/or logic for providing automated and personalized support to a merchant 102 based on a merchant account context. For example, when a merchant 102 is logged into a merchant account, the automated support module 122 can generate a merchant account context for the merchant account and compare the merchant account context to a plurality of support rules to determine whether a problem exists with the merchant account. To generate the merchant account context, the automated support module 122 queries the merchant account information database 128 to retrieve attributes of the merchant account that may be used to assess problems with the merchant account. For example, merchant account attributes may include the number of payments accepted by the merchant, the number of payment card swipes through a payment card reader, a payment card reader model, merchant bank account information, held funds associated with the merchant account, status of account set up, and the like.

Using the merchant account context and the plurality of support rules, the automated support module 122 determines a problem that the merchant may be experiencing with the merchant account and/or the merchant device 110. Each of the plurality of support rules defines a set of merchant account attributes that are indicative of a particular problem that a merchant may experience with a merchant account and/or the merchant device 110. The automated support module 122 compares the merchant account attributes from the merchant account context to the plurality of support rules and, if the merchant account attributes match a rule, the automated support module generates a message describing the problem and indicating a possible solution. In some embodiments, the message includes a link to a location within a merchant account support site where the merchant can fix the problem.

The analysis module 124 includes software and/or logic for analyzing a plurality of human generated responses, stored in the knowledge database 126, merchant account problems, and merchant account contexts to generate the plurality of support rules and possible solutions to merchant account problems. The rule generation process is described in more detail below with reference to FIG. 3. The knowledge database 126 stores a human curated dataset of responses to merchant account problems. For example, when a support representative works with a merchant to address a problem with a merchant account and/or a merchant device, the support representative may create a support ticket and the support ticket is saved in the knowledge database 126. A support ticket may include a description of the problem, a solution to the problem, and a snapshot of the merchant account context when the problem occurred.

Figure 2:
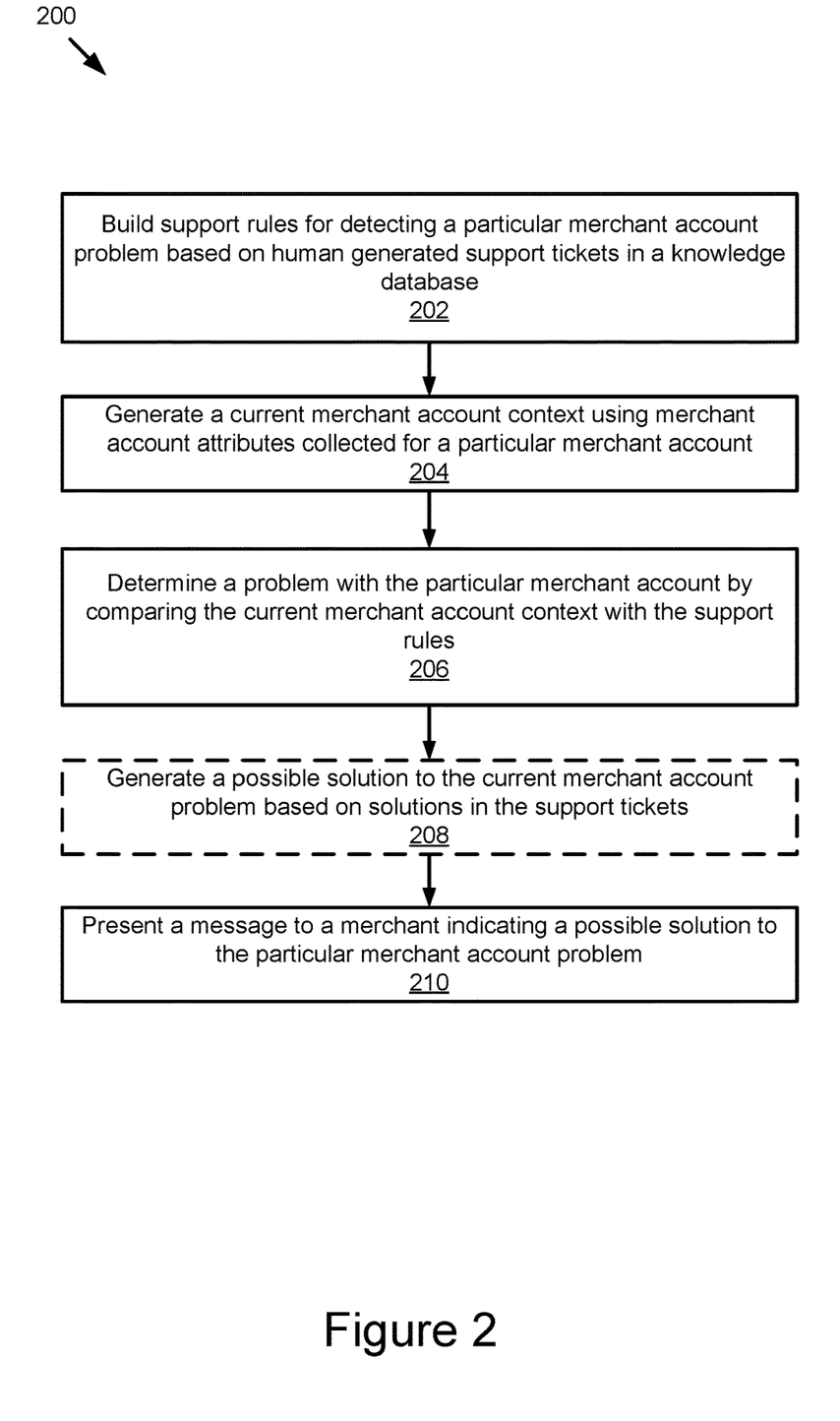
FIG. 2 is a flow diagram of an example process for proactively generating and presenting support messages for merchants using a mobile point-of-sale terminal.
Figure 3:
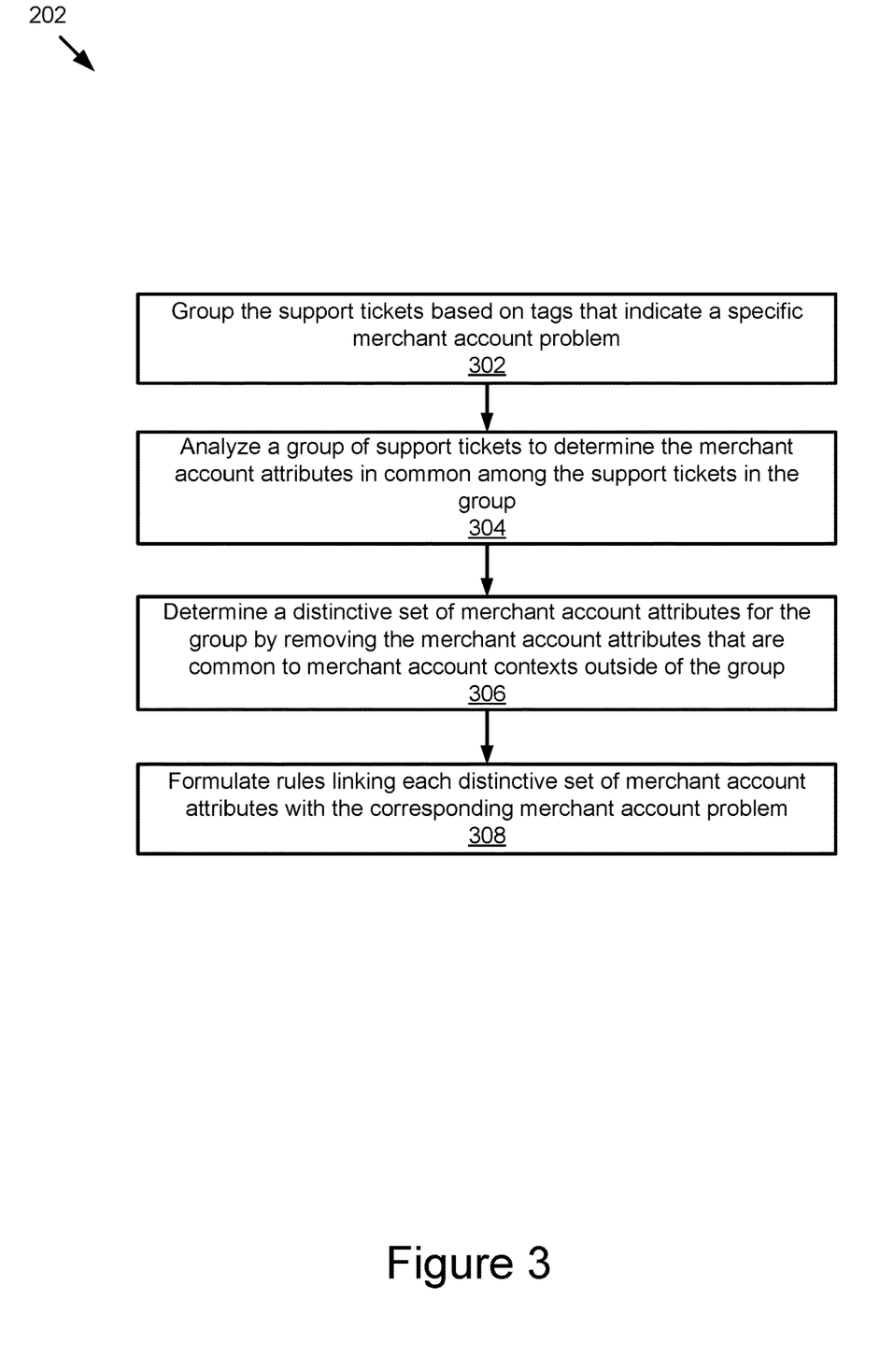
FIG. 3 is a flow diagram of an example process for building support rules for detecting merchant account problems.
Figure 4:
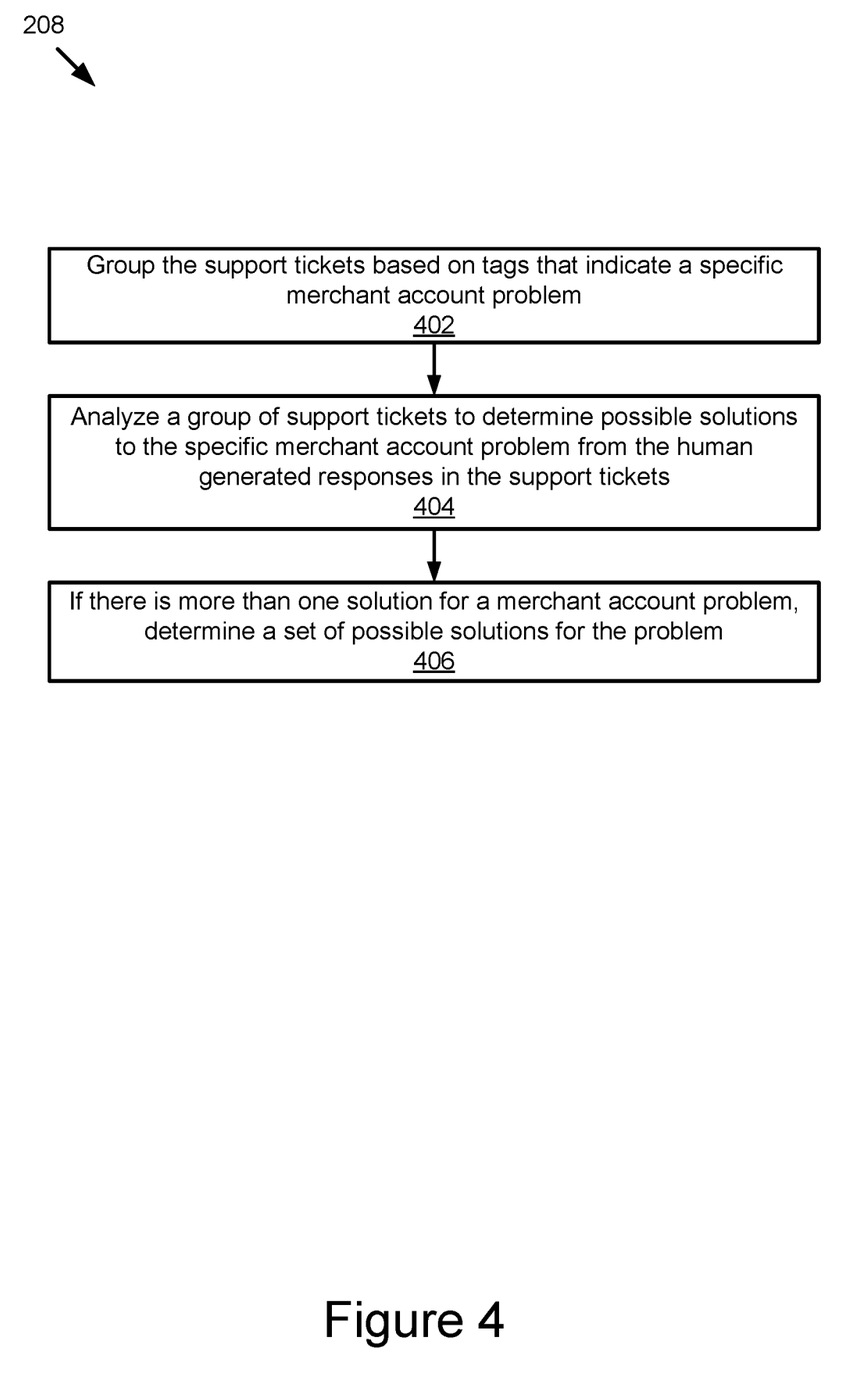
FIG. 4 is a flow diagram of an example process for generating a possible solution to a merchant account problem.

The processes described in FIGS. 2, 3, and 4 are each illustrated as a collection of blocks in logical flow diagrams, which represent a sequence of operations, some or all of which can be implemented in hardware, software, or a combination thereof. The order in which the blocks are described should not be construed as a limitation. Any number of the described blocks can be combined in any order and/or in parallel to implement the processes, or alternative processes, and not all of the blocks need be executed. For ease of description, the processes are described with reference to the environments, architectures and systems described in the examples herein, although the processes may be implemented in a wide variety of other environments, architectures and systems.

FIG. 2 is a flow diagram of an example process 200 for proactively generating and presenting support messages to merchants using a mobile point-of-sale terminal. At 202, in one embodiment, the analysis module 124 builds support rules for detecting a particular merchant account problem based on human generated support tickets in the knowledge base 126. For example, the analysis module 124 analyzes all support tickets that were created for a particular problem to find merchant account attributes that are similar between merchant accounts with the particular problem but different from merchant accounts not experiencing the problem. The automated rule generation process is described in more detail below with reference to FIG. 3. In another embodiment, the support rules for detecting a particular merchant account problem may be human generated. For example, the automated support module 122 may provide an interface for merchant account support staff of the payment processor service provider to generate support rules based on experience in helping merchants with account problems.

At 204, the automated support module 122 generates a current merchant account context using merchant account attributes for a particular merchant account. In one embodiment, the automated support module 122 generates the current merchant account context in response to receiving merchant account login information from a merchant 102. The automated support module 122 generates the current merchant account context in this way so that a current state of the merchant account can be used to determine a problem with the merchant account. In other embodiments, the automated support module 122 generates the current merchant account context at regular intervals, at predefined times, and/or in response to other signals generated at the payment processor system 112.

At 206, the automated support module 122 determines a problem with the particular merchant account by comparing the current merchant account context for the particular merchant account with the support rules. For each rule, the automated support module 122 compares an attribute of the merchant account, captured in the current merchant account context, with an attribute value or range of values defined in the rule. Each rule may have one or more merchant account attributes, and values for those merchant account attributes, that are indicative of a merchant account problem for which the rule was generated. If the attribute of the merchant account matches the attribute value or is within the range of values, the automated support module 122 continues comparing merchant account attributes with the remaining attribute values defined in the rule. However, if an attribute does not match a value or fall within a range of values defined in the rule, the automated support module 122 stops comparing attributes with attribute values in the current rule and moves to the next rule for comparison. If the attributes of the merchant account, captured in the current merchant account context, match all the attribute values or fall within the range of attribute values defined in the rule, the automated support module 122 determines that the merchant account is experiencing the problem for which the rule was generated.

In some embodiments, the analysis module 124 may optionally generate a possible solution to the current merchant account problem at 208. For example, as described in more detail below with reference to FIG. 4, the analysis module 124 analyzes human generated support tickets addressing the current merchant account problem and determines and most likely solution to the problem based on the human generated responses associated with the support tickets. At 210, the automated support module 122 presents a message to the merchant associated with the merchant account indicating a possible solution to the particular merchant account problem. The message may also include a link to a location within a merchant dashboard or merchant support site where the merchant can address the particular merchant account problem. For example, the link may lead the merchant to a location to change account settings, activate a bank account, provide more account information, download tax forms, etc.

In one embodiment, for example when the merchant logs in to a website associated with the payment service provider, the message may be displayed as a banner on the website. Scanning for, and notifying merchants of, any problems with a merchant account on log in is particularly advantageous since this saves time for both the merchant and the payment service provider in having to diagnose the problem and come up with a solution. The website associated with the payment service provider may be, for example, a merchant dashboard or a merchant support site. Additionally, if the particular merchant account problem is urgent, the banner may lock the website associated with the payment service provider until the problem has been resolved. Alternatively, the banner itself may not be dismissible by the merchant until the problem has been resolved, but the merchant may access the website associated with the payment service provider. If the automated support module 122 detects multiple problems with the merchant account, the messages may be ranked according to a priority and displayed to the user in the order of the priority.

In another embodiment, the automated support module 122 may transmit the message to be communicated to the merchant through a register application running on the merchant device 110. For example, the message may be displayed as a banner, a pop-up, or the like, when the merchant is logged in to the register application. Additionally, the merchant device 110 may receive the message and display a notification to the merchant even when the merchant is not logged in to the register application. In yet another embodiment, the automated support module 122 may periodically analyze merchant accounts even when a merchant is not logged on to a website associated with the payment service provider and send an email, or some other communication, to the merchant with the message indicating the problem with the merchant account.

FIG. 3 is a flow diagram of an example process 202 for building support rules for detecting merchant account problems. At 302, the analysis module 124 groups the support tickets based on tags that indicate a specific merchant account problem. The tags may be generated as part of the human generated support ticket. For example, a support team may be supplied with a number of macros, each associated with a particular merchant account problem, to be used in assisting merchants with merchant account problems and the macro identifier may be used as a tag for a specific merchant account problem. In addition to a macro identifier, each macro may tag the support ticket with one or more keywords that may be used to group the support tickets. The analysis module 124 uses the tags to group the support tickets that are dealing with the same particular merchant account problem so that merchant account attributes indicative of that particular problem can be isolated as described in more detail below.

At 304, the analysis module 124 analyzes each group of support tickets to determine the merchant account attributes in common among the support tickets in a group. Particularly, the analysis module 124 compares the account context associated with each support ticket that was captured at the time the human generated response was made. Additionally, the analysis module 124 may determine whether the common merchant account attributes are correlated with the particular merchant account problem, for example, by performing a regression analysis or similar technique. When the analysis module 124 has determined a set of common merchant account attributes among the account contexts associated with the support tickets, at 306, the analysis module 124 determines a distinctive set of merchant account attributes for the group by removing the merchant account attributes, from the set of common merchant account attributes, that are common to merchant account contexts outside of the group.

Finally, at 308, the analysis module 124 formulates rules linking each distinctive set of merchant account attributes with the corresponding merchant account problem. As described above, each rule includes a list of merchant account attributes and associated merchant account values that, when present in a merchant account context, indicate a particular problem with the merchant account.

FIG. 4 is a flow diagram of an example process 208 for generating a possible solution to the current merchant account problem. At 402, the analysis module 124 groups the support tickets based on tags that indicate a specific merchant account problem. The tags may be generated as part of the human generated support ticket as described above. The analysis module 124 uses the tags to group the support tickets that are dealing with the same particular merchant account problem so that human generated responses to a particular problem can be used to determine a likely solution to be sent in the message to the merchant.

At 404, the analysis module 124 analyzes a group of support tickets to determine possible solutions to the merchant account problem associated with that group of support tickets. As described above, the support tickets include responses that were provided to the merchants by a support agent in response to a support inquiry. In one embodiment, the analysis module 124 determines a likely solution to the merchant account problem by selecting the most commonly provided response. In other embodiments, the analysis module 124 takes into account effectiveness and/or satisfaction with the response in determining the likely solution. For example, the payment processing service provider may receive feedback from merchants regarding responses given by support agents in response to the support query and factor the feedback into determining the likely solution. The feedback may be used, for example, to weight the responses given by support agents and the response with the highest average weight may be chosen as the likely solution.

If there is more than one likely solution for merchant account problem, the analysis module 124, at 406, determines a set of possible solutions that can be provided with the message regarding the merchant account problem. In one embodiment, the set of possible solutions may be ranked in order of effectiveness and/or satisfaction and presented simultaneously to the merchant in the message. In another embodiment, only the top ranked solution may be present in the message with a link for the merchant to follow where the additional solutions may be presented.

Figure 5:
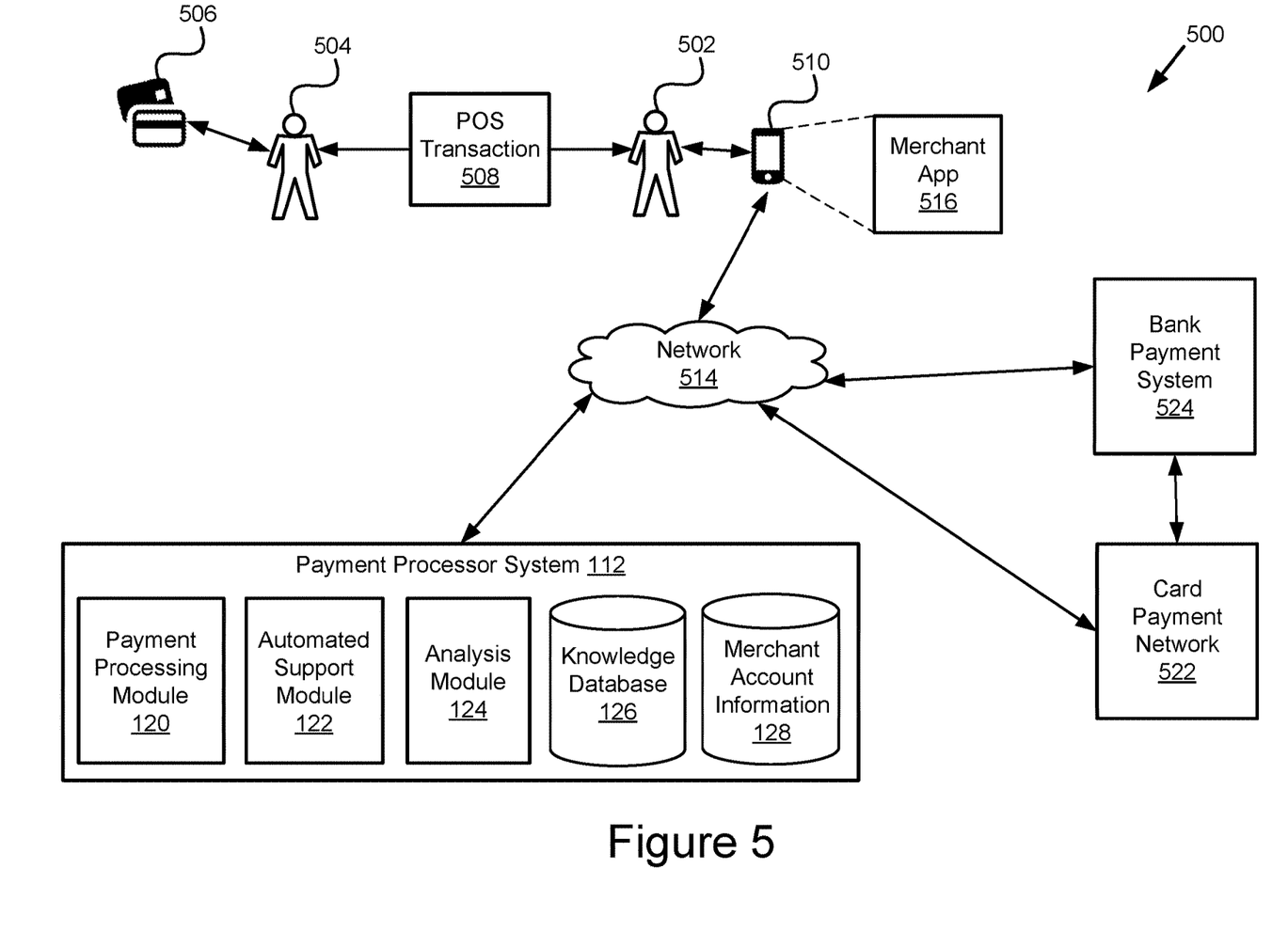
FIG. 5 illustrates an example architecture of a payment communication system for enabling transactions between merchants and buyers.

FIG. 5 illustrates an example architecture of a payment communication system 500 for enabling transactions between merchants 502 and buyers 504. In the example of FIG. 5, a buyer 504 may use any of a variety of payment cards 506 when participating in a POS transaction 508 with a merchant 502. For example, a buyer 504 may typically have payment cards 506 such as credit cards, debit cards, prepaid cards, and the like, that the buyer 504 may use for conducting POS transaction 508. In some embodiments, the payment cards 506 may include one or more magnetic stripes for providing payment card and buyer information when swiped in a card reader. In other embodiments, other types of payment cards may be used, for example smart cards having a built-in integrated circuit including a memory chip, a radio frequency identification tag, and the like.

The payment communication system 500 in the example of FIG. 5 illustrates a merchant device 510 associated with the merchant 502 that participates in the payment service provided by the service provider of the payment processor system 512. As discussed elsewhere herein, the merchant device 510 may be a computing device (e.g., a mobile computing device) able to communicate with the payment processor system 512, and with various other computing devices, through any suitable communication protocols, interfaces, and networks, including network 514. Further, the merchant device 510 may be any appropriate device operable to send and receive requests, messages, or other types of information over the network 514. Additionally, while only a single merchant device 510 is illustrated in the example of FIG. 5, there may be additional merchant devices depending on the number of merchants participating in the payment service.

Each merchant device 510 may include an instance of a merchant application 516 executed on the merchant device. The merchant application 516 may provide POS functionality to enable the merchant 502 to accept payments at a POS location using the merchant device 510. In some types of businesses, the POS location may correspond to a store or other place of business of the merchant 502, and thus, may be a fixed location that typically does not change on a day-to-day basis. In other types of businesses, however, the POS location may change from time to time, such as in the case that the merchant 502 operates a food truck, is a street vendor, a cab driver, or has an otherwise mobile business, e.g., in the case of merchants who sell items at buyers' homes, buyers' places of business, and so forth.

Accordingly, the merchant 502 and the buyer 504 may conduct a POS transaction 508 by which the buyer 504 acquires an item or service from the merchant 502 at a POS location. The merchant application 516 on the merchant device 510 may send transaction information to the payment processor system 512, for example, as the transaction is being conducted at the POS location. In some embodiments, such as if a particular merchant device 510 is not connected to the network 514 and is therefore processing transactions offline, the transaction information may be sent in a batch at a subsequent point in time or using other suitable techniques. In some embodiments, the transaction information may be sent via SMS, MMS, or a voice call over network 514 or various other networks.

The transaction information may include information regarding the time, place, and the amount of each respective transaction, information related to the item acquired, payment card information, as well as additional information, such as buyer information. For instance, the transaction information can include data stored in the payment card, e.g., magnetic stripe or integrated circuit data (cardholder name, card number, and other card information). In addition, when completing the transaction a buyer may sometimes provide a receipt email address for receiving a receipt through email. Other examples of transaction information that can be captured include detailed item information, e.g., an itemized listing of the items or services being acquired, the price being paid for each item or service, descriptors of the items or services (e.g., size, flavor, color, etc.), geolocation data indicating a geographic POS location of a particular transaction, online/offline card data, data describing the merchant, e.g., a merchant identifier, a merchant category code (MCC), any type of data that is received upon a buyer's authentication into a social network, if any, and various other types of information.

To accept electronic payments for POS transactions, the merchant 502 typically creates a merchant account on the payment processor system 512 by providing information describing the merchant including, for example, merchant name, contact information (e.g., telephone numbers, the merchant's address, and one or more financial accounts to which funds collected from buyers will be deposited). This merchant information can be securely stored by the service provider, for example, as merchant account information 128 in a secure database. Further, the merchant information may include a merchant profile created for each merchant. The merchant profile may include information about the merchant 502 and transaction information associated with transactions conducted by the merchant.

The payment processor system 512 enables a payment service provider to provide a payment service in which merchants 502 are able to conduct POS transactions 508 with a plurality of buyers 504, such as for selling services and/or products to the buyers 504. The payment processor system 512 may include one or more servers that are configured to process secure electronic financial transactions, for example, payment during a POS transaction 508, by communicating with the merchant device 510, card payment networks 522, and bank or other financial institution payment systems 524. The payment processor system 512 includes a payment processing module 120 that receives transaction information for processing payments made through the merchant application 516. For example, the payment processing module 120 may receive transaction information, such as an amount of the transaction, and may verify that a particular payment card 506 can be used to pay for the transaction, such as by contacting a card clearinghouse of a card payment network 522. Furthermore, in some examples, the payment processing module 120 may redirect payment information for transactions to be made using payment cards 506 to a bank payment system 524, or a payment system for some other financial institution. In other embodiments, the merchant device 510 may communicate directly with an appropriate card payment network 522 or bank payment system 524 for approving or denying a transaction using a particular payment card 506 for a POS transaction 508.

As introduced above, the payment processor system 512 may be configured to communicate with one or more systems of a card payment network 522 (e.g., MasterCard®, VISA®, or the like) over the network 514 to conduct financial transactions electronically. The payment processor system 512 may also communicate with one or more bank payment systems 524 of one or more banks, or other financial institutions, over the network 514. For example, the payment processor system 512 may communicate with an acquiring bank, a payment card issuing bank, and/or a bank maintaining buyer accounts for electronic payments.

A payment card acquiring bank may be a registered member of a card association (e.g., Visa®, MasterCard®, or the like), and may be part of a card payment network 522. A payment card issuing bank may issue payment cards 506 to buyers 504, and may pay acquiring banks for purchases made by cardholders to which the issuing bank has issued a payment card 506. Accordingly, in some embodiments, the systems of an acquiring bank may be included in the card payment network 522 and may communicate with systems of a payment card issuing bank to obtain payment. Further, in some embodiments, bank payment systems 524 may include systems associated with debit card issuing institutions, in which case, the systems of the debit card issuing institution may receive communications regarding a transaction in which the buyer uses a debit card instead of a credit card. Additionally, there may be systems of other financial institutions involved in some types of transactions or in alternative system architectures, and thus, the foregoing are merely several examples.

The payment processor system 512 includes an automated support module 122, an analysis module 124, and a knowledge database 126 for providing automated, real time analysis and support for merchant accounts as described elsewhere herein.

The network 514 can be a conventional type, wired or wireless, and may have numerous different configurations including a star configuration, token ring configuration, or other configurations. Furthermore, the network 514 may include a local area network (LAN), a wide area network (WAN) (e.g., the internet), and/or other interconnected data paths across which multiple devices may communicate. In some embodiments, the network 514 may be a peer-to-peer network. The network 514 may also be coupled with or include portions of a telecommunications network for sending data using a variety of different communication protocols. In some embodiments, the network 514 may include Bluetooth (or Bluetooth low energy) communication networks or a cellular communications network for sending and receiving data including via short messaging service (SMS), multimedia messaging service (MMS), hypertext transfer protocol (HTTP), direct data connection, WAP, email, etc. Although the example of FIG. 5 illustrates one network 514 coupled to the merchant device, payment processor system, card payment network, and bank, in practice one or more networks 514 can connect these entities.

Figure 6:
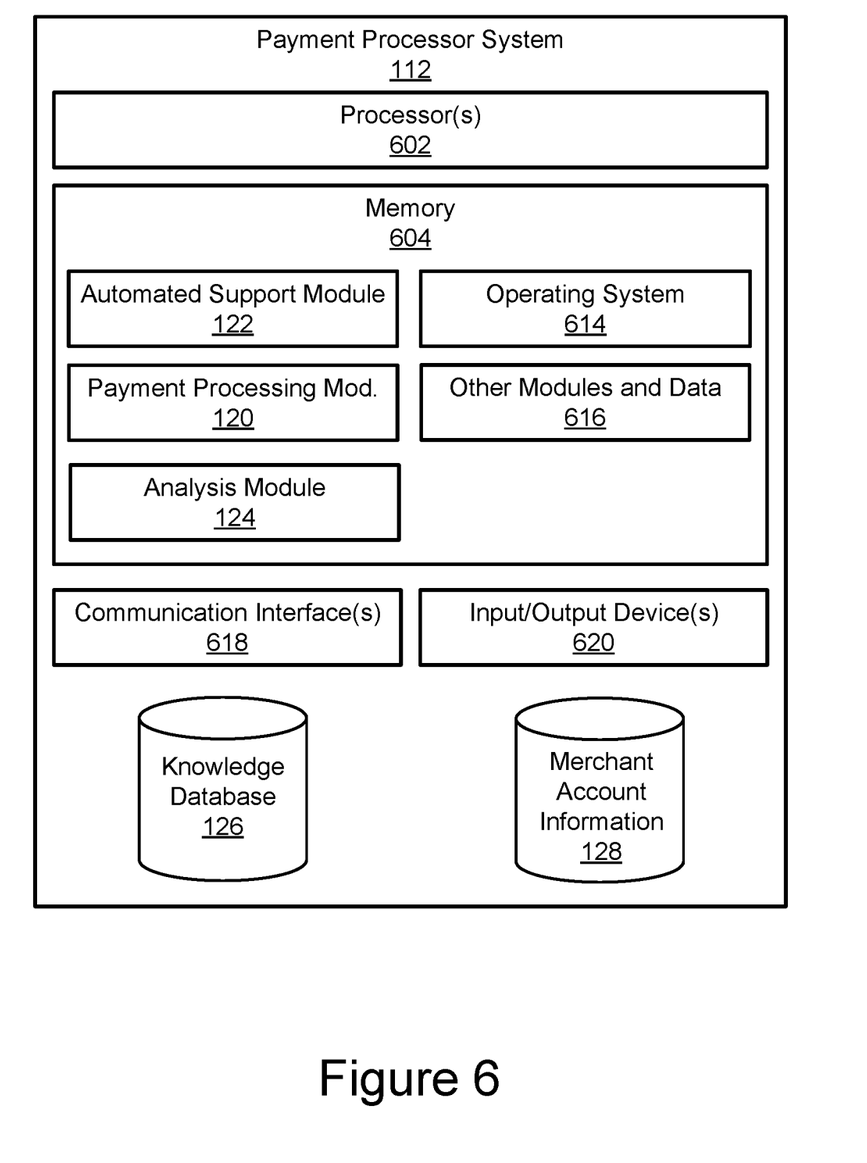
FIG. 6 is a block diagram illustrating select components of an example payment processor system according to some embodiments.

FIG. 6 is a block diagram illustrating select components of an example payment processor system 512 according to some embodiments. The payment processor system 512 may be any suitable type of computing device capable of sending communications and performing the functions according to the techniques described herein and may be operated by a service provider that provides the payment service. For instance, in the case of a server providing the payment provider system 512, the modules, other functional components, and data may be implemented on a single server, a cluster of servers, a server farm or data center, a cloud-hosted computing service, a cloud-hosted storage service, and so forth, although other computer architectures may additionally or alternatively be used.

Further, while the examples herein illustrate the components and data of the payment processor system 512 as being present in a single location, these components and data may alternatively be distributed across different computing devices and different locations. Consequently, the functions may be implemented by one or more computing devices, with the various functionality described above distributed in various ways across the different computing devices, to collectively implement the payment processor system 512. Multiple payment processor systems 512 may be located together or separately, and organized, for example, as virtual servers, server banks and/or server farms. The described functionality may be provided by the servers of a single entity or enterprise, or may be provided by the servers and/or services of multiple different buyers or enterprises.

In the example of FIG. 6, the payment processor system 512 includes one or more processors 602, one or more memory devices 604, one or more communication interfaces 618, and one or more input/output devices 620. Additionally, the payment processor system may include data stores, such as knowledge database 126 and merchant account information 128. These components may be similar to those described above with reference to FIG. 5 and elsewhere herein.

The memory 604 may be used to store and maintain any number of functional components or modules that are executable by the processor 602. In some embodiments, these functional components comprise instructions or programs that are executable by the processor 602 and that, when executed, implement operational logic for performing the actions and services attributed above to the payment processor system 512. Functional components of the payment processor system 512 stored in the memory 604 may include the payment processing module 120, automated support module 124, and analysis module 124. These components may be similar to those describe above with reference to FIG. 5 and elsewhere herein. Additional functional components may include an operating system 614 for controlling and managing various functions of the payment processor system and for enabling basic user interactions with the payment processor system 512. In addition, the memory 604 may store data used for performing the operations described herein. Further, the payment processor system 512 may include many other logical, programmatic and physical components, of which those described above are merely examples that are related to the discussion herein.

Figure 7:
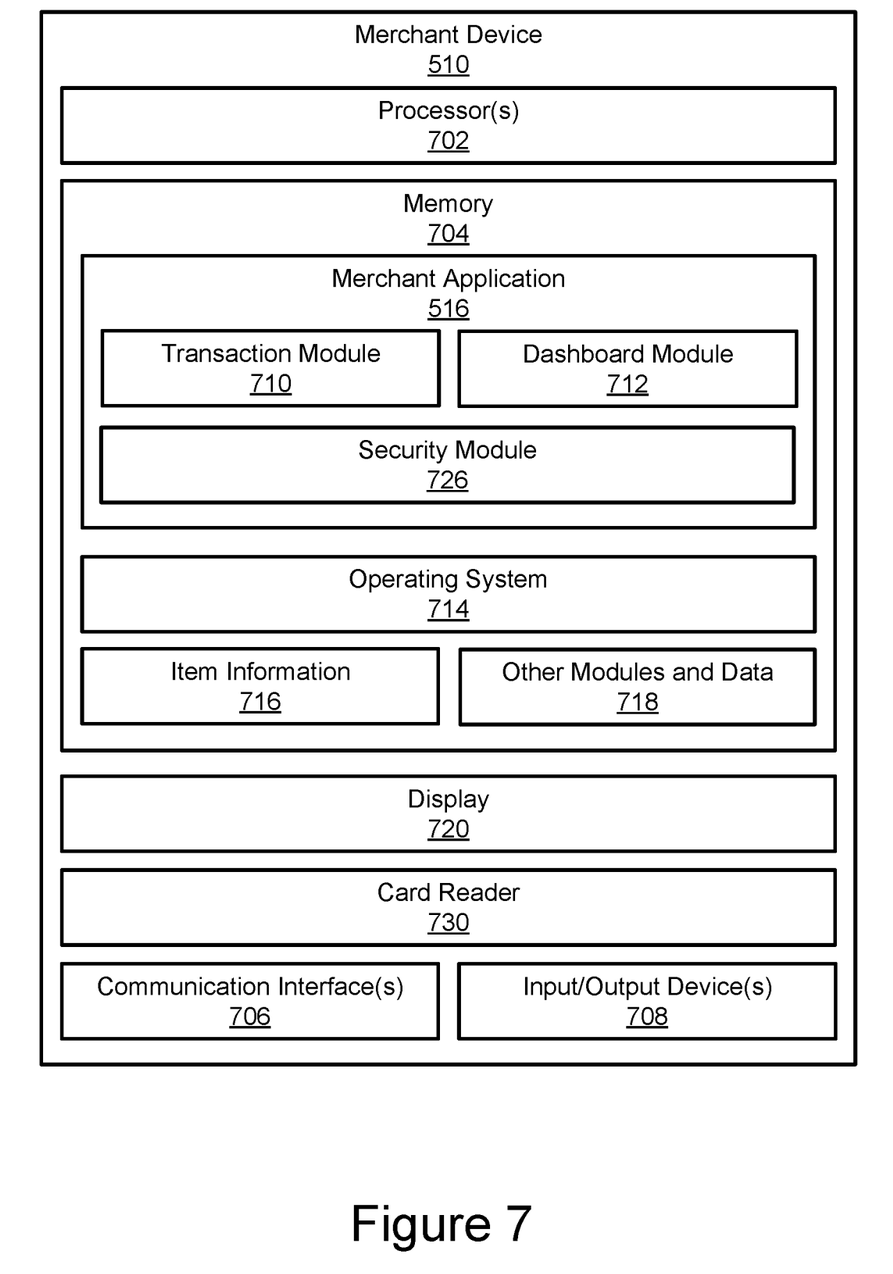
FIG. 7 is a block diagram illustrating select components of an example merchant device according to some embodiments.

FIG. 7 is a block diagram illustrating select components of an example merchant device 510 according to some embodiments. The merchant device 510 may be any suitable type of computing device, for example, portable, semi-portable, semi-stationary, or stationary. Some examples of the merchant device 510 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body mounted computing devices; augmented reality devices; or other computing devices capable of sending communications and performing the functions according to the techniques described herein.

In the example of FIG. 7, the merchant device 510 includes at least one processor 702, a memory 704, one or more communication interfaces 706, and one or more input/output (I/O) devices 708. Each processor 702 may itself comprise one or more processors or processing cores. For example, the processor 702 can be implemented as one or more microprocessors, microcomputers, microcontrollers, digital signal processors, central processing units, state machines, logic circuitries, and/or any devices that manipulate signals based on operational instructions. In some embodiments, the processor 702 may be one or more hardware processors and/or logic circuits of any suitable type specifically programmed or configured to execute the algorithms and processes described herein by performing various input/output, logical, and/or mathematical operations. The processor 702 can be configured to fetch and execute computer-readable processor-executable instructions stored in the memory 704.

Depending on the configuration of the merchant device 510, the memory 704 may be an example of tangible, non-transitory computer storage media and may include volatile and nonvolatile memory and/or removable and non-removable media implemented in any type of technology for storage of information such as computer-readable processor-executable instructions, data structures, program modules or other data. The memory 704 may include, but is not limited to, RAM, ROM, EEPROM, flash memory, solid-state storage, magnetic disk storage, optical storage, and/or other computer-readable media technology. Further, in some cases, the merchant device 510 may access external storage, such as RAID storage systems, storage arrays, network attached storage, storage area networks, cloud storage, or any other medium that can be used to store information and that can be accessed by the processor 702 directly or through another computing device or network. Accordingly, the memory 704 may be computer storage media able to store instructions, modules or components that may be executed by the processor 702.

The memory 704 may be used to store and maintain any number of functional components or modules that are executable by the processor 702. In some embodiments, these functional components comprise instructions or programs that are executable by the processor 702 and that, when executed, implement operational logic for performing the actions and services attributed above to the merchant device 510. Functional components of the merchant device 510 stored in the memory 704 may include the merchant application 516. In this example, the merchant application 516 includes a transaction module 710, a dashboard module 712, and a security module 726. The transaction module 710, for example, presents an interface, such as a payment interface to enable the merchant to conduct transactions, receive payments, and so forth, as well as for communicating with the payment processor system 512 for processing payments and sending transaction information. The dashboard module 712 enables the merchant to manage the merchant's account, the merchant profile, merchant preferences, view saved or new pricing information, and the like. The security module 726 may, as described herein, enable the merchant application 516 to encrypt and decrypt transaction information communicated between the merchant device 510 and other system components. Additional functional components may include an operating system 714 for controlling and managing various functions of the merchant device 510 and for enabling basic user interactions with the merchant device 510.

In addition, the memory 704 may also store data, data structures and the like, that are used by the functional components. For example, data stored by the memory 704 may include item information 716 that includes information about the items offered by the merchant, which may include a list of items currently available from the merchant, images of the items, descriptions of the items, prices of the items, and so forth. For instance, when the merchant 502 is setting up the merchant application 516 to accept payments for particular items offered by the merchant 502, the merchant may enter the item information 716 for the particular items. Depending on the type of the merchant device 510, the memory 704 may also optionally include other functional components and data, such as other modules and data 718, which may include programs, drivers, etc., and the data used or generated by the functional components. Further, the merchant device 510 may include many other logical, programmatic and physical components, of which those described are merely examples that are related to the discussion herein.

The communication interface(s) 706 may include one or more interfaces and hardware components for enabling communication with various other devices, such as over the network(s) 514 or directly. For example, communication interface(s) 706 may enable communication through one or more of the internet, cable networks, wireless networks (e.g., Wi-Fi) and wired networks, as well as close-range communications such as Bluetooth®, Bluetooth® low energy, and the like, as additionally enumerated elsewhere herein.

In another embodiment, the communication interface(s) 706 may include a cellular communications transceiver for sending and receiving data over a cellular communications network such as via voice call, short messaging service (SMS), multimedia messaging service (MMS), hypertext transfer protocol (HTTP), direct data connection, WAP, e-mail or another suitable type of electronic communication. The communication interface(s) 706 also provides other conventional connections to the network 514 for distribution of files and/or media objects using standard network protocols such as TCP/IP, HTTP, HTTPS and SMTP as will be understood.

The merchant device 510 may further include a display 720, which may employ any suitable display technology. For example, the display 720 may be a liquid crystal display, a plasma display, a light emitting diode display, an OLED (organic light-emitting diode) display, an electronic paper display, or any other suitable type of display able to present digital content thereon. In some embodiments, the display 720 may have a touch sensor associated with the display 720 to provide a touchscreen display configured to receive touch inputs for enabling interaction with a graphical user interface presented on the display 720. Accordingly, embodiments described herein are not limited to any particular display technology.

The merchant device 510 may further include one or more I/O devices 708. The I/O devices 708 may include speakers, a microphone, a camera, and various user controls (e.g., buttons, a joystick, a keyboard, a keypad, etc.), a haptic output device, and so forth.

In addition, the merchant device 510 may include or may be connectable to a payment card reader 730. In some embodiments, the payment card reader 730 may plug in to a port in the merchant device, such as a microphone/headphone port. In other embodiments, the mobile device interface may include other physical connectors, standardized or proprietary, for coupling the payment card reader 730 with the merchant device 510. In yet other embodiments, the payment card reader 730 may use a low power wireless communication interface (e.g., Bluetooth, Bluetooth Low Energy, Zigbee, or the like) to communicatively couple the payment card reader 730 with the merchant device 510 without a physical connection. The payment card reader 730 may include a card interface for reading a magnetic stripe or an integrated circuit of a payment card 506, and further may include encryption hardware and/or logic for encrypting the information read from the payment card 506. Alternatively, numerous other types of payment card readers 730 may be employed with the merchant devices 510 herein, depending on the type and configuration of the merchant device 510.

As used here, the term "payment card" refers to a payment mechanism which includes a debit card, a conventional credit card, "smartcards" that have embedded integrated circuit chips (e.g., Europay-MasterCard-Visa (EMV) cards), or any wallet-size card which functions as a combination of any of these payment mechanisms. In some embodiments, payment card may also include a virtual payment card stored on a device such as a smart phone or other device and transmittable, for example, via near field communication or other suitable means.

Other components included in the merchant device 510 may include various types of sensors (not shown), which may include a GPS device, an accelerometer, gyroscope, compass, proximity sensor, and the like. Additionally, the merchant device 510 may include various other components that are not shown, examples of which include removable storage, a power source, such as a battery and power control unit, and so forth.

A payment communication system using a payment card reader has been described. In the above description, for purposes of explanation, numerous specific details are set forth in order to provide a thorough understanding of the techniques introduced herein. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware. However, the techniques may be implemented using any type of computing system that can receive data and commands, and present information as part of any peripheral device providing services.

Reference in the specification to "one embodiment" or "an embodiment" means that a particular feature, structure, or characteristic described in connection with the embodiment is included in at least one embodiment of the description. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware embodiment, an entirely software embodiment or an embodiment containing both hardware and software elements. In one embodiment, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments has been presented for the purposes of illustration and description. It is not intended to be exhaustive or to limit the techniques to the precise form disclosed. Many modifications and variations are possible in light of the above teaching. It is intended that the scope of the embodiments be limited not by this detailed description, but rather by the claims of this application. As will be understood by those familiar with the art, the examples described herein may be embodied in other specific forms without departing from the spirit or essential characteristics thereof. Likewise, the particular naming and division of the modules, routines, features, attributes, methodologies and other aspects are not mandatory or significant, and the mechanisms that implement the techniques or features may have different names, divisions and/or formats. Furthermore, as will be apparent to one of ordinary skill in the relevant art, the modules, routines, features, attributes, methodologies and other aspects of the techniques can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, known to those of ordinary skill in the art of computer programming. Additionally, the techniques are in no way limited to implementation in any specific programming language, or for any specific operating system or environment. Accordingly, the specification is intended to be illustrative, but not limiting, of the scope of the claims, which are set forth below.

What is claimed is:

1. A payment processing system for processing a financial transaction between a buyer and a merchant using a mobile point-of-sale (POS) terminal comprising:
a proactive support module configured to:
collect data associated with a plurality of attributes of a merchant account with the payment processing system, wherein the merchant account is associated with the merchant and receives payment information from the buyer via the mobile POS terminal;
determine a state of the merchant account, wherein the state comprises at least the plurality of attributes;
determine a problem with the merchant account at least in part by analyzing the plurality of attributes with regard to a plurality of rules, wherein a rule of the plurality of rules defines a value or a range of values for an attribute of the plurality of attributes; and
generate, for display, a message regarding the problem with the merchant account; a knowledge database of a plurality of support tickets, each support ticket including:
a previous problem with the merchant account or an account of another merchant;
a corresponding state of the merchant account or the account of the other merchant, wherein the corresponding state comprises a plurality of attributes of the merchant account or the account of the other merchant; and
a human generated response to the previous problem;
an analysis module configured to:
retrieve, from the knowledge database, a particular support ticket of the plurality of support tickets;
determine a particular corresponding state included in the particular support ticket;
determine a value or range of values for at least one particular attribute comprising the particular corresponding state, wherein the at least one value or range of values for the at least one particular attribute indicates a particular account problem; and
generate a rule specifying the particular account problem and at least the value or the range of values for the at least one particular attribute indicating the particular account problem.

2. The payment processing system of claim 1, wherein the analysis module is further configured to analyze human generated responses for each of the plurality of support tickets to determine a likely solution to the problem with the merchant account.

3. A method comprising:
receiving login information at a site associated with a merchant account, the merchant account for receiving payment information from a buyer via a mobile point-of-sale (POS) terminal;
in response to receiving the login information, determining a state of the merchant account, wherein the state comprises at least the plurality of account attributes of the merchant account;
determining, by analyzing the state of the merchant account with regard to a plurality of rules, a problem with the merchant account, wherein each rule of the plurality of rules specifies a particular problem and defines a value or range of values indicating the particular problem for at least one account attribute; and
generating a message for display regarding the problem.

4. The method of claim 3, further comprising:
retrieving a plurality of support tickets from a knowledge database of support tickets for the problem with the merchant account, each support ticket including a human generated response to the problem and a corresponding state of a merchant account associated with the support ticket;
analyzing the corresponding state for each of the plurality of support tickets for the problem with the merchant account to determine a value or range of values for at least one of the particular plurality of account attributes that indicate the problem; and generating a particular rule for detecting the problem with the merchant account using the values or ranges of values for the at least one of the particular plurality of account attributes.

5. The method of claim 3, wherein the message includes a link to a location within a help site for the merchant account that addresses the problem.

6. The method of claim 3, wherein the message includes a link to a location where a user can correct the problem.

7. The method of claim 3, further comprising, in response to determining the problem with the merchant account, disabling the merchant account until the problem is remedied.

8. The method of claim 3, further comprising:
determining, using the state of the merchant account and the plurality of rules, a plurality of problems with the merchant account;
ranking the plurality of problems; and
generating a message for each of the plurality of problems one at a time in ranked order.

9. The method of claim 3, further comprising:
retrieving a plurality of support tickets from a knowledge database of support tickets for the problem with the merchant account, each support ticket including a human generated response to the problem and a corresponding state of an account associated with the support ticket; and
analyzing the plurality of human generated responses to the problem to determine a likely solution to the problem.

10. A method comprising:
retrieving, by a mobile point-of-sale (POS) payment processor system, a plurality of human generated solutions from a knowledge database of resolved account problems, wherein each of the human generated solutions indicates a particular account problem and a corresponding state of a particular account;
analyzing the corresponding state for each of the plurality of human generated solutions to determine a plurality of historical account attributes that indicate the particular account problem;
generating a particular rule for detecting the particular account problem using the plurality of historical account attributes, wherein the particular rule:
indicates the particular account problem;
defines the plurality of historical account attributes; and
defines a corresponding value or ranges of values, specific to the particular account problem, for at least one historical account attribute of the plurality of historical account attributes;
receiving login information from a user of an account support site, the login information for an account associated with the user for receiving payment information from a buyer via a mobile POS terminal;
generating a state for the account associated with the user, wherein the state includes at least the account attributes of the account associated with the user;
detecting, for the account associated with the user, using the state for the account associated with the user and a plurality of rules, the particular account problem associated with the user, wherein detecting comprises matching the plurality of historical account attributes defined by the particular rule, and matching the corresponding values or ranges of values defined by the particular rule, with the state and account attributes of the account associated with the user; and
generating a message for presentation to the user regarding the particular account problem.

11. The method of claim 10, wherein the message includes a link to a location within the account support site that addresses the particular account problem.

12. The method of claim 10, wherein the message includes a link to a location in the account associated with the user where the user can correct the particular account problem.

13. The method of claim 10, further comprising, in response to detecting the particular account problem, disabling the account associated with the user until the particular account problem is remedied.

14. The method of claim 10, further comprising:
determining, using the state and the plurality of rules, a plurality of account problems;
ranking the plurality of account problems; and
presenting a message for each of the plurality of account problems one at a time in ranked order.

15. The method of claim 10, further comprising:
analyzing the plurality of human generated responses to the particular account problem to determine a likely solution to the particular account problem.

16. An account support system comprising:
one or more processors; and
a memory storing instructions, which when executed by the one or more processors, cause the account support system to:
receive account login information from a user of a site associated with a merchant account, the merchant account configured for receiving payment information from a buyer via a mobile point-of-sale (POS) terminal;
determine a state of the merchant account using a plurality of account attributes;
determine, using the state and a plurality of rules, a problem with the merchant account, wherein each rule of the plurality of rules indicates a particular problem with the merchant account, and wherein each rule defines a value or a range of values specific to the particular problem for at least one of the plurality of account attributes; and
generate a message for display regarding the problem.

17. The account support system of claim 16, wherein the instructions further cause the system to:
retrieve a plurality of support tickets from a knowledge database of support tickets for the problem with the merchant account, each support ticket including a human generated response to the problem with the merchant account and a corresponding state of a particular account about which the problem was reported;
analyze the corresponding state for each of the support tickets for the problem with the merchant account to determine a value or a range of values specific to the particular problem for at least one of the plurality of account attributes; and
generate a rule for detecting the problem with the merchant account using the plurality of account attributes.

18. The account support system of claim 16, wherein the message includes a link to a location where the user can correct the problem.

19. The account support system of claim 16, wherein, in response to determining the problem with the account, the instructions cause the account support system to disable the account until the problem is remedied.

20. The account support system of claim 16, wherein the instructions further cause the account support system to:
   retrieve a plurality of support tickets from a knowledge database of support tickets for the problem with the merchant account, each support ticket including a human generated response to the problem with the merchant account and a corresponding state of a particular account about which the problem was reported; and
   analyze the plurality of human generated responses to the problem with the account to determine a likely solution to the problem.

* * * * *